United States Patent
Loh et al.

(10) Patent No.: US 9,229,803 B2
(45) Date of Patent: Jan. 5, 2016

(54) DIRTY CACHELINE DUPLICATION

(71) Applicant: Advanced Micro Devices, Inc., Sunnyvale, CA (US)

(72) Inventors: Gabriel H. Loh, Bellevue, WA (US); Vilas K. Sridharan, Brookline, MA (US); James M. O'Connor, Austin, TX (US); Jaewoong Sim, Atlanta, GA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 162 days.

(21) Appl. No.: 13/720,536

(22) Filed: Dec. 19, 2012

(65) Prior Publication Data

US 2014/0173379 A1  Jun. 19, 2014

(51) Int. Cl.
*G06F 11/10* (2006.01)
*G06F 12/08* (2006.01)

(52) U.S. Cl.
CPC ........ *G06F 11/1064* (2013.01); *G06F 12/0893* (2013.01)

(58) Field of Classification Search
CPC ............ G06F 11/1064; G06F 12/0891; G06F 12/0864
USPC .......... 714/764; 711/118, 133, 128
See application file for complete search history.

(56) References Cited

U.S. PATENT DOCUMENTS

| | | | |
|---|---|---|---|
| 7,310,712 B1 * | 12/2007 | Gordon | 711/161 |
| 2003/0084250 A1 * | 5/2003 | Gaither et al. | 711/133 |
| 2004/0010663 A1 * | 1/2004 | Prabhu | 711/143 |
| 2004/0221110 A1 * | 11/2004 | Rowlands et al. | 711/133 |
| 2006/0224829 A1 * | 10/2006 | Evrard et al. | 711/133 |
| 2007/0058410 A1 * | 3/2007 | Rajan | 365/63 |
| 2008/0104334 A1 * | 5/2008 | Bellaton et al. | 711/141 |
| 2011/0022801 A1 * | 1/2011 | Flynn | 711/120 |
| 2013/0346699 A1 * | 12/2013 | Walker | 711/128 |
| 2014/0089593 A1 * | 3/2014 | Vera et al. | 711/133 |
| 2014/0122809 A1 * | 5/2014 | Robertson et al. | 711/141 |
| 2014/0165056 A1 * | 6/2014 | Ghai et al. | 718/1 |

* cited by examiner

*Primary Examiner* — Albert Decady
*Assistant Examiner* — Kyle Vallecillo
(74) *Attorney, Agent, or Firm* — Park, Vaughan, Fleming & Dowler LLP

(57) ABSTRACT

A method of managing memory includes installing a first cacheline at a first location in a cache memory and receiving a write request. In response to the write request, the first cacheline is modified in accordance with the write request and marked as dirty. Also in response to the write request, a second cacheline is installed that duplicates the first cacheline, as modified in accordance with the write request, at a second location in the cache memory.

20 Claims, 11 Drawing Sheets

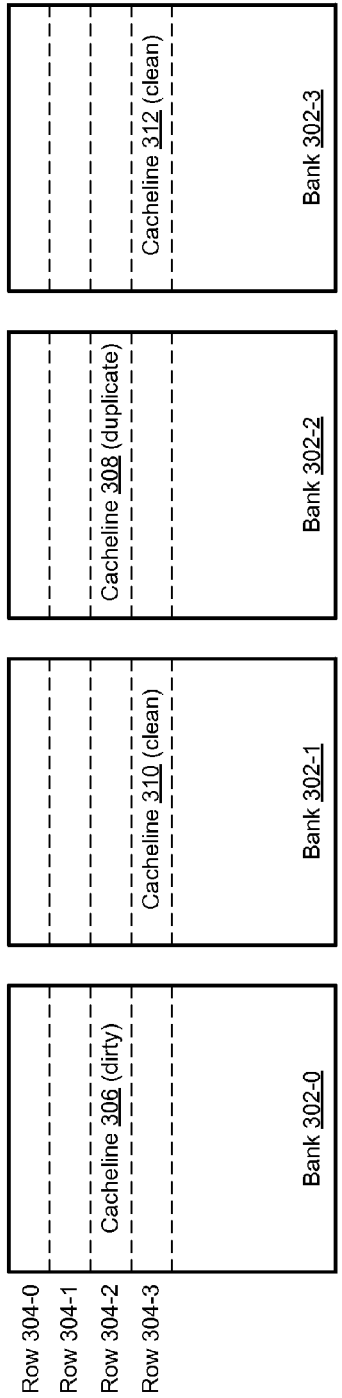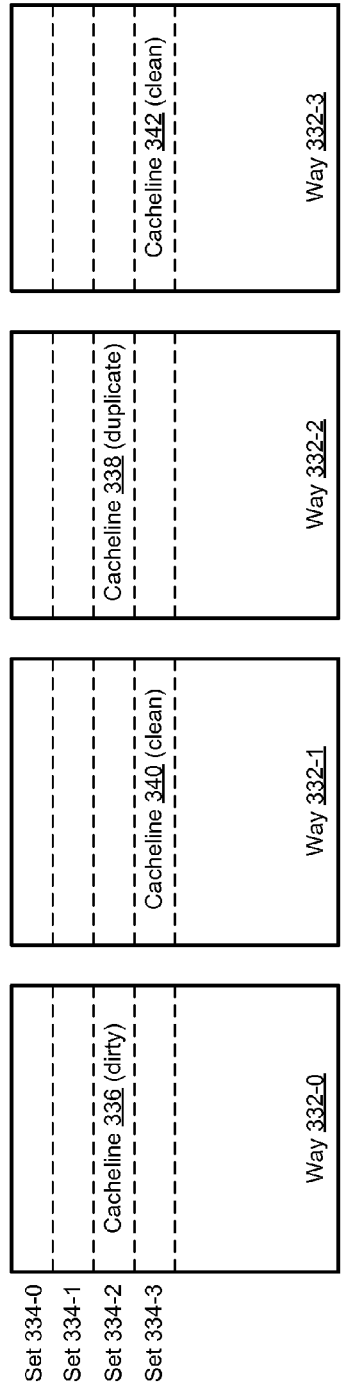

DIRTY CACHELINE DUPLICATION

TECHNICAL FIELD

The present embodiments relate generally to cache memory, and more specifically to cache memory reliability.

BACKGROUND

A memory system may use error-correction codes (ECC) to achieve a specified level of reliability, availability, and serviceability (RAS). ECC improves RAS but adds overhead in the form of additional die area in the memory arrays for storing the bits used to implement the ECC and increased computational complexity. While RAS may be improved by using increasingly complex ECC schemes, the increased ECC complexity results in increased overhead.

SUMMARY

Embodiments are disclosed in which dirty cachelines in a cache memory are duplicated.

In some embodiments, a method of managing memory includes installing a first cacheline at a first location in a cache memory. A write request is received. In response, the first cacheline is modified in accordance with the write request and marked as dirty. Also in response to the write request, a second cacheline is installed that duplicates the first cacheline, as modified in accordance with the write request, at a second location in the cache memory.

In some embodiments, a memory system includes a cache memory to store a plurality of cachelines at respective locations, including a first cacheline at a first location. The memory system also includes a cache controller to receive a write request and, in response to the write request, to modify the first cacheline in accordance with the write request, mark the first cacheline as dirty, and install a second cacheline that duplicates the first cacheline, as modified in accordance with the write request, at a second location in the cache memory.

In some embodiments, a non-transitory computer-readable storage medium stores instructions, which when executed by one or more processor cores in a processing system, cause the processing system to request data to be read from a first cacheline in a cache memory; identify a second cacheline as a duplicate of the first cacheline, in response to detection of an uncorrectable error in the data from the first cacheline; and request data to be read from the second cacheline, in response to identifying the second cacheline as a duplicate of the first cacheline.

BRIEF DESCRIPTION OF THE DRAWINGS

The present embodiments are illustrated by way of example and are not intended to be limited by the figures of the accompanying drawings.

FIG. 3A illustrates a direct-mapped cache memory array in accordance with some embodiments.

FIG. 3B illustrates a set-associative cache memory array in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
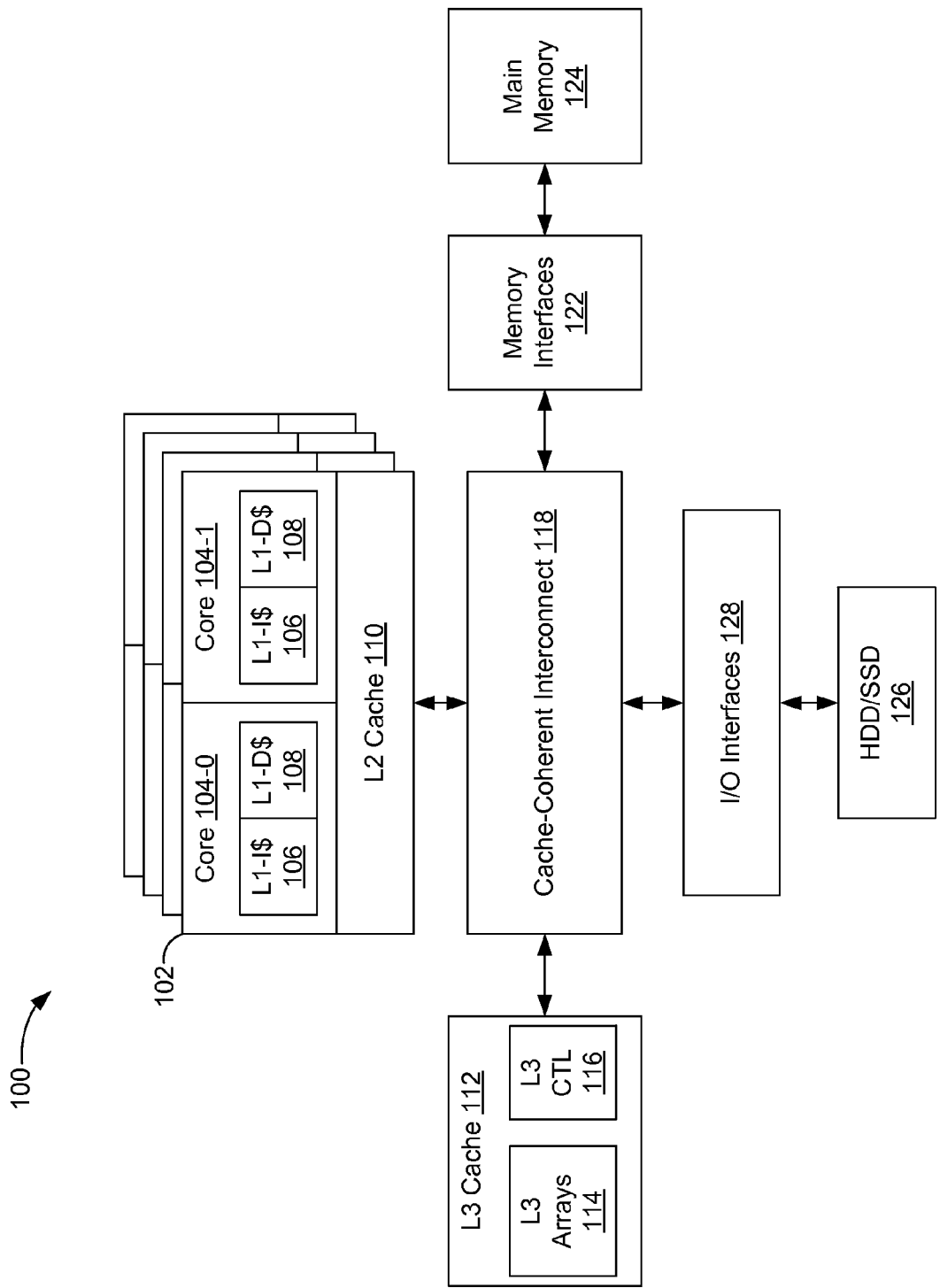
FIG. 1 is a block diagram showing a memory system in accordance with some embodiments.

FIG. 1 is a block diagram showing a memory system 100 in accordance with some embodiments. The memory system 100 includes a plurality of processing modules 102 (e.g., four processing modules 102), each of which includes a first processor core 104-0 and a second processor core 104-1. Each of the processor cores 104-0 and 104-1 includes a level 1 instruction cache memory (L1-I$) 106 to cache instructions to be executed by the corresponding processor core 104-0 or 104-1 and a level 1 data cache (L1-D$) memory 108 to store data to be referenced by the corresponding processor core 104-0 or 104-1 when executing instructions. A level 2 (L2) cache memory 110 is shared between the two processor cores 104-0 and 104-1 on each processing module 102.

A cache-coherent interconnect 118 couples the L2 cache memories 110 (or L2 caches 110, for short) on the processing modules 102 to a level 3 (L3) cache memory 112 (or L3 cache 112, for short). The L3 cache 112 includes L3 memory arrays 114 to store information cached in the L3 cache 112. Associated with the L3 cache 112 is an L3 cache controller (L3 CTL) 116. (The L1 caches 106 and 108 and L2 caches 110 also include memory arrays and have associated cache controllers, which are not shown in FIG. 1 for simplicity.)

In the example of FIG. 1, the L3 cache 112 is the highest-level cache memory in the memory system 100 and is therefore referred to as the last-level cache (LLC). In other examples, a memory system may include an LLC above the L3 cache 112. In some embodiments, the L1 caches 106 and 108, L2 caches 110, and L3 cache 112 are implemented using static random-access memory (SRAM).

In addition to coupling the L2 caches 110 to the L3 cache 112, the cache-coherent interconnect 118 maintains cache coherency among the L2 caches 110. The cache-coherent interconnect 118 is also coupled to main memory 124 through memory interfaces 122. In some embodiments, the main memory 124 is implemented using dynamic random-access memory (DRAM). In some embodiments, the memory interfaces 122 coupling the cache-coherent interconnect 118 to the main memory 124 are double-data-rate (DDR) interfaces.

The cache-coherent interconnect 118 is also connected to input/output (I/O) interfaces 128, which allow the cache-coherent interconnect 118, and through it the processing modules 102, to be coupled to peripheral devices. The memory interfaces 122 may include interfaces to a hard-disk drive (HDD) or solid-state drive (SSD) 126. An SSD 126 may be implemented using Flash memory or other nonvolatile solid-state memory.

The L1 caches 106 and 108, L2 caches 110, L3 cache 112, and main memory 124 (and in some embodiments, the HDD/SSD 126) form a memory hierarchy in the memory system 100. Each level of this hierarchy has less storage capacity but faster access time than the level above it: the L1 caches 106 and 108 offer less storage but faster access than the L2 caches 110, which offer less storage but faster access than the L3 cache 112, which offers less storage but faster access than the main memory 124. The memory system 100 is merely an example of a multi-level memory system configuration; other configurations are possible.

The L1 caches 106 and 108, L2 caches 110, and/or L3 cache 112 may use an error-correcting code (ECC) that allows a first number of errors in a cacheline to be detected and a second number of errors in a cacheline to be corrected (e.g., with the first number being greater than the second number). To implement ECC, ECC bits are stored in respective cachelines. ECC improves reliability but adds overhead in the form of additional die area in the memory arrays for storing the bits used to implement the ECC and increased computational complexity. Increasingly complex ECGs allow detection and correction of increasingly large first and second numbers of errors, but at the cost of increased die area and computational complexity.

Information stored in a specified level of memory (e.g., in an L2 cache 110, L3 cache 112, main memory 124, or HDD/SSD 126) of the memory system 100 may be fetched from the specified level of memory and installed as a cacheline in a lower level of cache memory (e.g., in an L1 cache 106 or 108, L2 cache 110, or L3 cache 112). When the cacheline is first installed, a duplicate copy of it exists in the specified level of memory from which it was fetched. At this point, if the cacheline is corrupted with an error that the ECC cannot correct, the block of information can be recovered from the duplicate copy. An example of such an uncorrectable error is an error that the ECC can detect (e.g., the number of incorrect bits is less than or equal to the first number) but cannot correct (e.g., the number of incorrect bits is greater than the second number). If the cacheline is subsequently modified, however, and thus becomes dirty, then a duplicate of the cacheline no longer exists: the block of information in the specified level of memory from which the cacheline was originally fetched no longer matches the dirty cacheline. In this situation, if the dirty cacheline becomes corrupted with an uncorrectable error, the modified block of information cannot be recovered from the specified level of memory. A system failure then results; for example, a fault is raised.

To avoid this situation without increasing ECC complexity, a duplicate of the cacheline is created (e.g., in the same level of cache as the cacheline) when the cacheline is modified and thus becomes dirty. If the dirty cacheline then becomes corrupted with an uncorrectable error, the modified block of information that it stores can be recovered from the duplicate cacheline.

Figure 2:
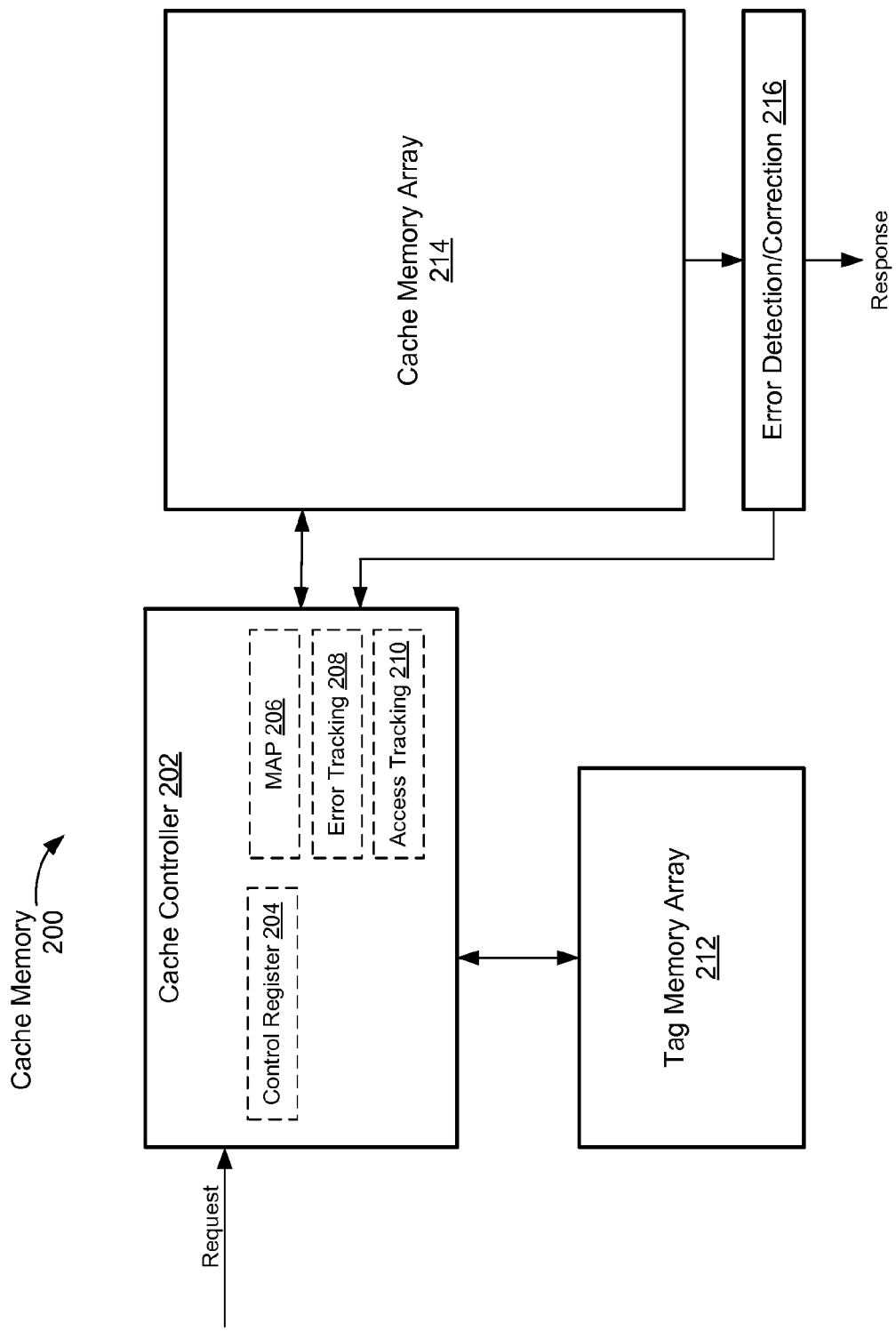
FIG. 2 is a block diagram of a cache memory and associated cache controller in accordance with some embodiments.

FIG. 2 is a block diagram of a cache memory (and associated cache controller) 200 in accordance with some embodiments. The cache memory 200 is a particular instance of a level of cache memory (e.g., an L1 cache 106 or 108, an L2 cache 110, or the L3 cache 112, FIG. 1) in the memory system 100 (FIG. 1). The cache memory 200 includes a cache memory array 214 and a tag memory array 212. A cache controller 202 is coupled to the cache memory array 214 and tag memory array 212 to control operation of the cache memory array 214 and tag memory array 212.

Physical addresses for information cached in respective cachelines in the cache memory array 214 are divided into multiple portions, including an index and a tag. (Alternatively, the tag may be part of the virtual address). Cachelines are installed in the cache memory array 214 at locations indexed by the index portions of the corresponding physical addresses, and tags are stored in the tag memory array 212 at locations indexed by the index portions of the corresponding physical addresses. (A cacheline may correspond to a plurality of physical addresses that share common index and tag portions.) To perform a memory access operation in the cache memory 200, a memory access request is provided to the cache controller 202 (e.g., from a processor core 104-0 or 104-1, FIG. 1). The memory access request specifies a physical address. If a tag stored at a location in the tag memory array 212 indexed by the index portion of the specified physical address matches the tag portion of the specified physical address, then a cache hit occurs and the cacheline at a corresponding location in the cache memory array 214 is returned (in response to a read request) or modified (in response to a write request). Otherwise, a cache miss occurs.

The cache memory array 214 is coupled to an error detection and/or correction module 216. In some embodiments, the module 216 uses ECC to detect a first number of errors in a cacheline and correct a second number of errors in the cacheline. For example, the module 216 may implement single-error-correct/double-error-detect (SECDED) ECC (e.g., using a Hamming code) that can correct a single-bit error in a cacheline and detect a two-bit error in a cacheline. In this example, a two-bit error is an uncorrectable error: it can be detected but not corrected. In other embodiments, the module 216 detects certain types of errors but does not perform error correction; in such embodiments, all detected errors are uncorrectable. For example, cachelines stored in the cache memory 214 may include a parity bit to indicate whether the cacheline has an even or odd number of bits with the value "1" (or alternatively, "0"). The module 216 may use the parity bit to identify, but not correct, a single-bit error in the cacheline. In another example, cachelines stored in the cache memory 214 may include a cyclic redundancy check (CRC) checksum that the module 216 evaluates to perform multi-bit error detection. While CRCs provide multi-bit error detection, they do not provide allow for error correction.

In some embodiments, the error correction and/or detection technique used by the module 216 varies depending on the level of the memory system 100 (FIG. 1) in which the module 216 is situated. For example, L1 caches 106 and 108, which are read-only caches, may use parity-based error detection, while L2 caches 110 and the L3 cache 112, which are read-write caches, use SECDED ECC. Alternatively, one or more levels of cache may use more complex ECC, such as double-error-correct/triple-error-detect ECC. For example, BCH codes may be used for ECC.

When a cacheline is read from the cache memory array 214 in response to a read request provided to the cache controller 202, the error detection and/or correction module 216 determines whether there is an error in a cacheline. If the module 216 detects a correctable error, it corrects the error and provides the result. If the module 216 detects an uncorrectable error, it signals the occurrence of the uncorrectable error to the cache controller 202. The cache controller 202 then reads the duplicate cacheline, if one exists, and provides the result (e.g., as corrected by the module 216, if there is a correctable error). Examples of this process are provided below with respect to the method 760 of FIGS. 7D and 7E.

In some embodiments, the cache memory array 214 and tag memory array 212 are direct-mapped. FIG. 3A illustrates a direct-mapped cache memory array 300 in accordance with some embodiments. The direct-mapped cache memory array 300, which is an example of the cache memory array 214 (FIG. 2), includes N banks 302 (e.g., banks 302-0 through 302-3), where N is an integer greater than one. In FIG. 3A, N equals 4; in general, N may vary. The banks 302 are indexed 0 to N−1. Each of the banks 302 includes a plurality of rows 304 (e.g., rows 304-0, 304-1, 304-2, 304-3, and so on). The rows 304 are indexed by row numbers, starting from 0. Each cacheline in the direct-mapped cache memory array 300 has a distinct index, as specified by its physical address(es), that is a combination of the bank index and row index. This distinct index specifies a single location in the direct-mapped cache memory array 300 where the cacheline may be installed.

In the example of FIG. 3A, a cacheline 306 has been installed in row 304-2 of bank 302-0. The cacheline 306 has been modified and thus is dirty. When the cacheline 306 is first modified, a duplicate cacheline 308 is installed in row 304-2 of bank 302-2. In some embodiments, the location of the duplicate cacheline 308 (i.e., row 304-2 of bank 302-2) is determined by applying a mapping function to the location of the cacheline 306. For example, the mapping function may specify a duplicate location for which the row 304 is unchanged and the bank 302 is determined by the function $$\text{MAP}(i)=(i+N/2)\bmod N \quad (1)$$

where i is the index number of the bank 302 storing the cacheline to be duplicated (e.g., i=0 for cacheline 306, because it is in bank 302-0) and N is the number of banks 302. Applying this function to the location of cacheline 306, produces the result MAP(i)=2. The duplicate cacheline 308 is thus located in the bank 302-2, which has an index of 2, and more specifically in the row 304-2 of the bank 302-2, since this mapping function specifies the same row 304 as the cacheline 306 being duplicated.

The cache controller 202 (FIG. 2) includes a mapping module (MAP) 206 to perform mapping (e.g., the mapping of equation (1)).

The direct-mapped cache memory array 300 (FIG. 3A) also includes clean cachelines 310 and 312 in rows 304-3 of banks 302-1 and 302-3. The locations of the clean cachelines 310 and 312 map to each other using equation (1). If the cacheline 310 (or 312) were modified, and thus became dirty, the cacheline 312 (or 310) would be evicted and a duplicate of the cacheline 310 (or 312) would be installed in its place.

Figure 4A:
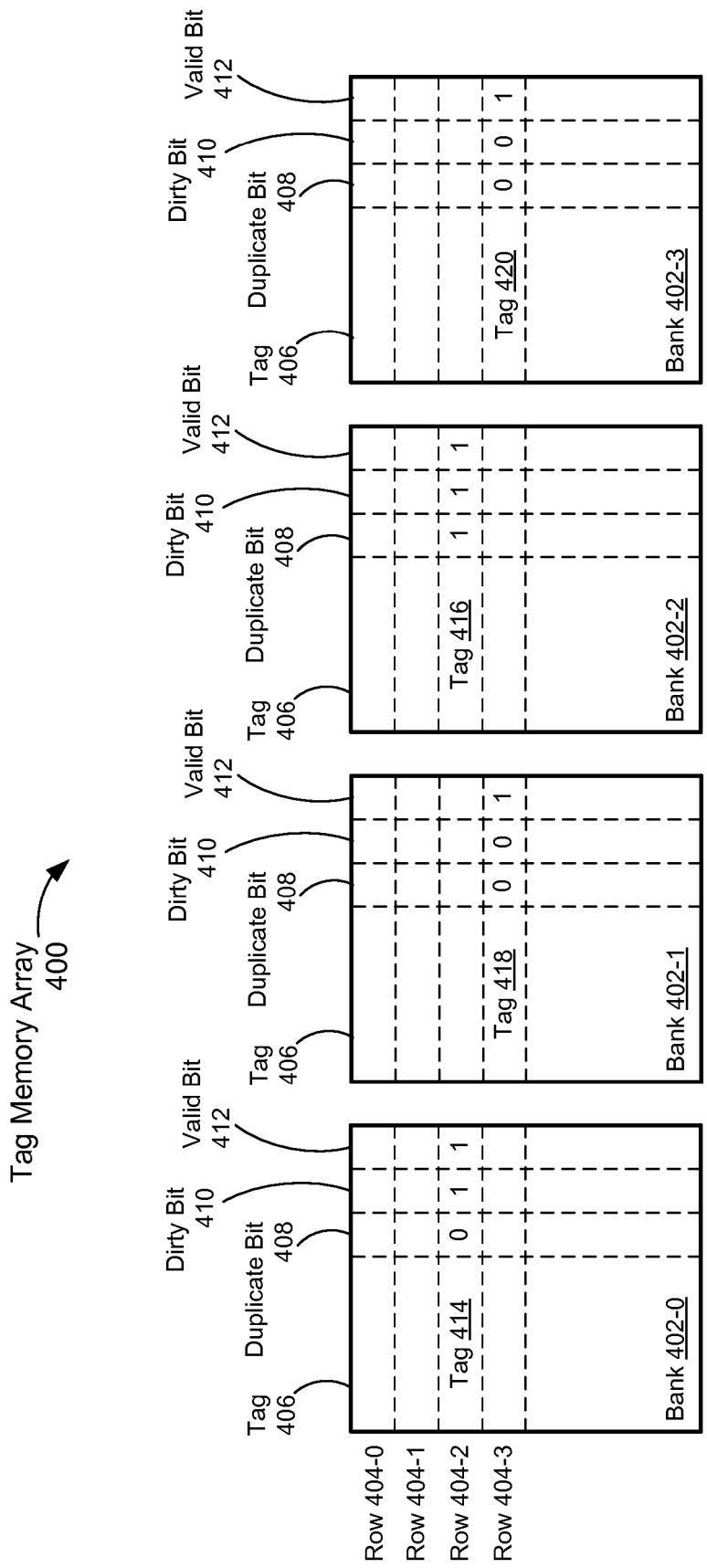
FIG. 4A illustrates a tag memory array that corresponds to the direct-mapped cache memory array of FIG. 3A in accordance with some embodiments.

FIG. 4A illustrates a tag memory array 400 that corresponds to the direct-mapped cache memory array 300 (FIG. 3A) and is an example of the tag memory array 212 (FIG. 2) in accordance with some embodiments. The tag memory array 400, like the direct-mapped cache memory array 300 (FIG. 3A), is divided into N banks 402 (e.g., banks 402-0 through 402-3). Each of the banks 402-0 through 402-3 includes a plurality of rows 404 (e.g., rows 404-0, 404-1, 404-2, 404-3, and so on). The number of rows 404 in each bank 402 equals the number of rows 304 in each bank 302 of the direct-mapped cache memory array 300 (FIG. 3A). Also, the banks 402 and rows 404 are indexed in the same manner as the banks 302 and rows 304 (FIG. 3A). The tag memory array 400 thus is direct-mapped.

Each row 404 includes a tag field 406 to store the tag of the cacheline in the corresponding row 304 (FIG. 3A). Rows 404-2 of banks 402-0 and 402-2 store tags 414 and 416, which are the tags for cachelines 306 and 308 (FIG. 3A), respectively. The tag 416 is therefore a duplicate of the tag 414. Rows 404-3 of banks 402-1 and 402-3 store tags 418 and 420, which are the tags for cachelines 310 and 312 (FIG. 3A), respectively.

In some embodiments, each row 404 may also include a duplicate bit field 408 to store a duplicate bit indicating whether the tag in the field 406 (and thus the corresponding cacheline) is a duplicate. In the example of FIGS. 3A and 4A, the cacheline 308 and tag 416 are respective duplicates of the cacheline 306 and tag 414. Accordingly, the duplicate bit in the field 408 of the row 404-2 containing the tag 416 is asserted (e.g., equals '1'), while the duplicate bit in the field 408 of the row 404-2 containing the tag 414 is de-asserted (e.g., equals '0'). The cachelines 310 and 312 are both clean and are not duplicates of each other; therefore, the duplicate bits in the fields 408 of the rows 404-3 containing the tags 418 and 420 are de-asserted (e.g., equal '0').

Alternatively, instead of storing a duplicate bit in a field 408, the tag field 406 is increased by one bit. The additional tag bit is used to distinguish original cachelines from duplicate cachelines. In yet another alternative, a bank identifier is embedded in the tag field 406 and then duplicated when the tag is duplicated, which occurs upon installation of the duplicate cacheline. A mismatching bank identifier thus indicates that the corresponding cacheline is a duplicate.

Each row 404 may further include a dirty bit field 410 to store a dirty bit and a valid bit field 412 to store a valid bit. The dirty bits in the fields 410 of the rows 404-2 containing the tags 414 and 416 are asserted (e.g., equal '1'), indicating that the corresponding cachelines 306 and 308 (FIG. 3A) are dirty. The dirty bits in the fields 410 of the rows 404-3 containing the tags 418 and 420 are de-asserted (e.g., equal '0'), indicating that the corresponding cachelines 310 and 312 (FIG. 3A) are clean. The valid bits in the fields 412 of the rows 404-2 and 404-3 containing the tags 414, 416, 418, and 420 are all asserted (e.g., equal '1'), indicating that the corresponding cachelines 306, 308, 310, and 312 (FIG. 3A) are valid. A cacheline may be invalidated by de-asserting the valid bit in the corresponding field 412.

The banks 302-0 through 302-3 (FIG. 3A), and corresponding banks 402-0 through 402-4 (FIG. 4B), are described with respect to a direct-mapped cache memory array 300 (FIG. 3A). In other embodiments, other types of cache memory arrays 214 (FIG. 2), and corresponding tag memory arrays 212 (FIG. 2), may include multiple banks. For example, a skewed-associative cache memory array or a cache memory array implemented using cuckoo hashing may include multiple banks. In some embodiments, the mapping logic 206 (FIG. 2) maps respective banks to other banks (e.g., using the mapping function of equation (1)) to determine locations for duplicate cachelines.

In some embodiments, the cache memory array 214 and tag memory array 212 are set-associative. FIG. 3B illustrates a set-associative cache memory array 330 in accordance with some embodiments. The set-associative cache memory array 330, which is an example of the cache memory array 214, is divided into N ways 332 (e.g., ways 332-0 through 332-3), where N is an integer greater than one. In FIG. 3B, N equals 4; in general, N may vary. The ways 322 are indexed 0 to N−1. The set-associative cache memory array 330 is also divided into a plurality of sets 334 (e.g., sets 334-0, 334-1, 334-2, 334-3, and so on). Each set 334 includes a plurality of cachelines, one from each way 332. The sets 334 are indexed, starting from 0. Each cacheline in the set-associative cache memory array 330 has an index, as specified by its physical address(es), that corresponds to a particular set 334. Each cacheline's index specifies the set 334 in which it may be installed, but each cacheline may be installed in any way 332. For example, while the cacheline 336 is shown as being installed in the set 334-2 and way 332-0, it could have been installed in any of the ways 332-1 through 332-3, so long as it were still installed in the set 334-2.

In the example of FIG. 3B, the cacheline 336 has been modified and thus is dirty. When the cacheline 336 is first modified, a duplicate cacheline 338 is installed in the way 332-2 of the set 334-2. In some embodiments, the location of the duplicate cacheline 338 is determined by applying a mapping function to the location of the cacheline 336. For example, the mapping function may specify a duplicate location for which the set 334-2 is unchanged and the way 332 is determined using the mapping function of equation (1), but with the variable i now indexing ways 332 (instead of banks 302) and the variable N being the number of ways 332. In some embodiments, this mapping is performed by the mapping module 206 of the cache controller 202 (FIG. 2). In some embodiments, instead of using mapping, the least recently used (LRU) way 332 in the set 334-2 is selected as the location of the duplicate cacheline 338. (In the example of FIG. 3B, the way 332-2 is thus the LRU way of the set 334-2 at the time of installation of the duplicate cacheline 338). The LRU way 332 may be identified using the access tracker 210 in the cache controller 202 (FIG. 2).

The set-associative cache memory array 330 (FIG. 3B) also includes clean cachelines 340 and 342 in ways 332-1 and 332-3 of the set 334-3. The locations of the clean cachelines 340 and 342 map to each other using equation (1). If the cacheline 340 (or 342) were modified, and thus became dirty, the cacheline 342 (or 340) would be evicted and a duplicate of the cacheline 340 (or 342) would be installed in its place.

In some embodiments, the number of dirty cachelines in a set 334, and thus the number of duplicate cachelines in the set 334, is limited to a specified number, to limit the reduction in capacity of the cache memory array 330 resulting from the duplicate cachelines. In one example, an 8-way set-associative cache is limited to two dirty cachelines, and thus two duplicate cachelines, per set. In some embodiments, if the number of dirty cachelines in a respective set exceeds the specified number, the excessive cachelines are written back to a higher level of memory and thus made clean, and their duplicates are invalidated.

Figure 4B:
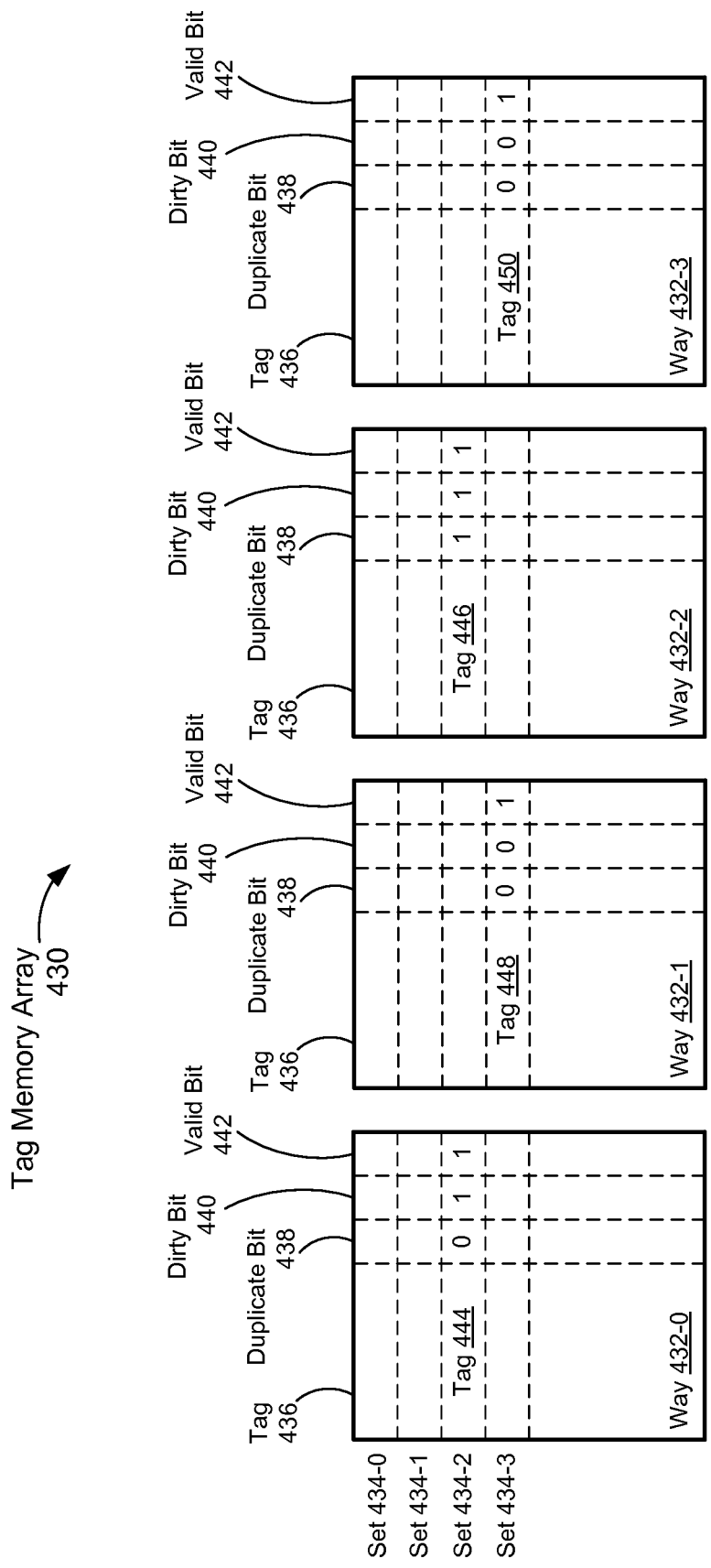
FIG. 4B illustrates a tag memory array that corresponds to the set-associative cache memory array of FIG. 3B in accordance with some embodiments.

FIG. 4B illustrates a tag memory array 430 that corresponds to the set-associative cache memory array 330 (FIG. 3B) and is an example of the tag memory array 212 (FIG. 2) in accordance with some embodiments. The tag memory array 430, like the set-associative cache memory array 330 (FIG. 3B), is divided into N ways 432 (e.g., ways 432-0 through 432-3) and into a plurality of sets 434 (e.g., rows 434-0, 434-1, 434-2, 434-3, and so on). The number of sets 434 equals the number of sets 334 in the set-associative cache memory array 330 (FIG. 3B). The sets 434 are indexed in the same manner as the sets 334 (FIG. 3B). The tag for a cacheline is stored in the set 434 and way 432 corresponding to the set 334 and way 332 (FIG. 3B) in which the cacheline is stored.

In the example of FIG. 4B, each set 434 includes within each way 432 a tag field 436, duplicate bit field 438, dirty bit field 440, and valid bit field 442. These fields are analogous to the tag field 406, duplicate bit field 408, dirty bit field 410, and valid bit field 412 (FIG. 4A). In some embodiments, the duplicate bit field 438 is omitted and instead the tag field 406 is increased by one bit, with the additional bit used to distinguish original cachelines from duplicate cachelines. In yet another alternative, a way identifier is embedded in the tag field 436 and then duplicated when the tag is duplicated upon installation of the duplicate cacheline. A mismatching way identifier indicates that the corresponding cacheline is a duplicate.

Ways 432-0 and 432-2 of set 434-2 store tags 444 and 446, which are the tags for cachelines 336 and 338 (FIG. 3B), respectively. The tag 446 is therefore a duplicate of the tag 444. Storing the tag 446 in the same set 434-2 as the tag 444 allows the tags 444 and 446 to be accessed in parallel in a single operation, thereby avoiding a duplicate access for the tag 446. The duplicate bit in the field 438 for the (duplicate) tag 446 is asserted (e.g., equals '1'), while the duplicate bit in the field 438 for the (original) tag 444 is de-asserted (e.g., equals '0'). Ways 432-1 and 432-3 of set 434-3 store tags 448 and 450, which are the tags for cachelines 340 and 342 (FIG. 3B), respectively. Since the cachelines 340 and 342 are not duplicates of each other, the duplicate bits in the fields 438 for the tags 448 and 450 are de-asserted (e.g., equal '0').

In the examples of FIGS. 3A and 3B, the mapping function of equation (1) selects a location for a duplicate cacheline that is in the same row 304 (FIG. 3A) or set 334 (FIG. 3B) as the original cacheline but in a different bank 302 (FIG. 3A) or way 332 (FIG. 3B). Assuming different banks 302 (FIG. 3A) or ways 332 (FIG. 3B) are situated in different physical banks of a cache memory array 214 (FIG. 2), selecting a different bank 302 or way 332 for the duplicate cacheline improves reliability by ensuring that the original and duplicate cachelines do not share common memory array components (e.g., bit lines, or entire physical banks). An error related to a particular memory array component (e.g., a column failure corresponding to a particular bit line, or failure of an entire physical bank) thus will not affect both the original and duplicate cachelines. In general, however, the mapping (e.g., as implemented by the mapping module 206, FIG. 2) may be arbitrary. A mapping function may be used that selects a different row 304 or set 334 in a different bank 302 or way 332 than the original cacheline (e.g., the cacheline to be duplicated), or a different row 304 or set 334 in the same bank 302 or way 332 as the original cacheline.

Furthermore, a mapping function (e.g., as implemented by the mapping module 206, FIG. 2) may identify a plurality of candidate locations (e.g., in different banks 302 or ways 332, FIGS. 3A-3B) for the duplicate cacheline. The cache controller 202 (FIG. 2) then selects one of the candidate locations as the location for the duplicate cacheline, based on one or more predefined criteria. For example, the cache controller 202 may include an error tracker 208 that tracks counts of errors (or error rates) for different portions (e.g., banks 302 or ways 332, FIGS. 3A-3B) of the cache memory array 214, as detected by the error detection and/or correction module 216. The mapping module 206 identifies candidate locations in different portions of the cache memory array 214; the cache controller 202 then selects the candidate in the portion with the lowest error count or rate (or a candidate in a portion with an error count or rate that is below a threshold). In another example, the cache controller includes an access tracker 210 that tracks how recently different portions (e.g., different ways 332 in a set 334, FIG. 3B) of the cache memory array 214 have been accessed. The mapping module 206 identifies candidate locations in different portions of the cache memory array 214; the cache controller 202 then selects the candidate in the least recently used (LRU) portion (e.g., the LRU way 332).

A mapping function MAP (e.g., as implemented by the mapping module 206, FIG. 2) may have the property that $$\text{MAP}(\text{MAP}(\text{addr})) = \text{addr} \qquad (2)$$

where "addr" is the address of an original cacheline. For example, the MAP function of equation (1) has this property. A mapping function with this property ensures that the location MAP(addr) is clean when the original cacheline at "addr" is clean. In some embodiments, when a mapping function with this property is used to install a duplicate cacheline at the location MAP(addr), the previous cacheline at the location MAP(addr) is simply invalidated (e.g., by de-asserting a valid bit in a bit field 412 or 442, FIGS. 4A-4B), because it is guaranteed to be clean.

In some embodiments, duplication of dirty cachelines (and use thereof) is performed selectively. For example, the cache controller 202 includes a control register 204 (FIG. 2) that enables duplication of dirty cachelines when a first value is stored in it and not when a second value is stored in it. In another example, duplication of dirty cachelines is enabled when an error count or rate, as tracked by the error tracking 208 based on errors detected by the module 216, satisfies a criterion (e.g., exceeds a threshold). In yet another example, duplication of dirty cachelines is enabled in response to a change in operating conditions (e.g., a reduction of the supply voltage) that may increase the error rate.

In some embodiments, duplication of dirty cachelines is enabled or disabled depending on the instruction executed by a processor core 104-0 or 104-1 (FIG. 1). For example, a first type of load instruction enables duplication of a dirty cacheline and a second type of load instruction disables duplication of a dirty cacheline.

In some embodiments, duplication of dirty cachelines is enabled or disabled for selective addresses or address ranges. For example, a duplicate-write mode bit is provided to the cache memory 200 along with a request. The duplicate-write mode bit enables dirty cacheline duplication when set to a first value (e.g., '1', or alternately '0') and not when set to a second value (e.g., '0', or alternately '1'). In some embodiments, the duplicate-write mode bits are assigned using page tables or memory-type range registers (MTRRs).

Figure 5A:
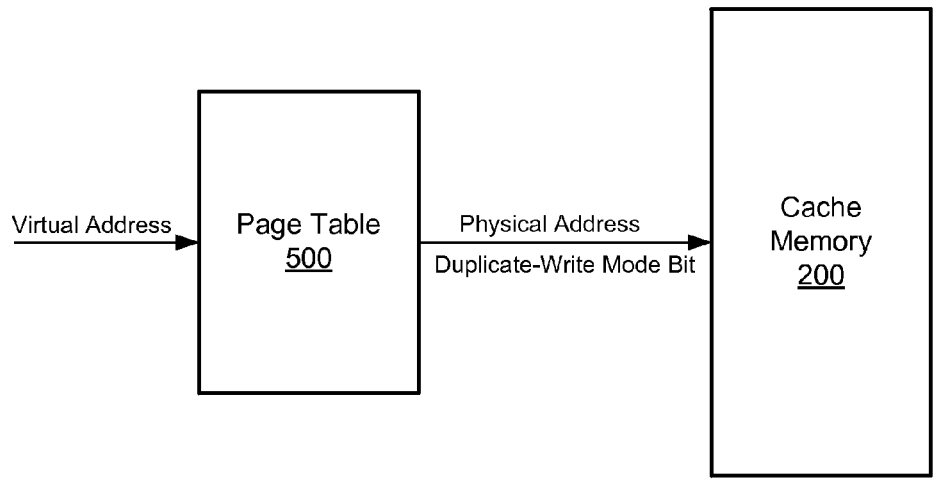
FIG. 5A is a block diagram showing a page table coupled to a cache memory and configured to assign duplicate-write mode bits to addresses in accordance with some embodiments.

FIG. 5A is a block diagram showing a page table 500 (e.g., implemented in a processor core 104-0 or 104-1, FIG. 1) coupled to a cache memory 200 (FIG. 2) in accordance with some embodiments. A virtual address (or portion thereof) specified in a memory access request (e.g., a write request) is provided to the page table 500, which maps the virtual address to a physical address and assigns a corresponding duplicate-write mode bit. The physical address and duplicate-write mode bit are provided to the cache memory 200 along with a command (not shown) corresponding to the request.

Figure 6A:
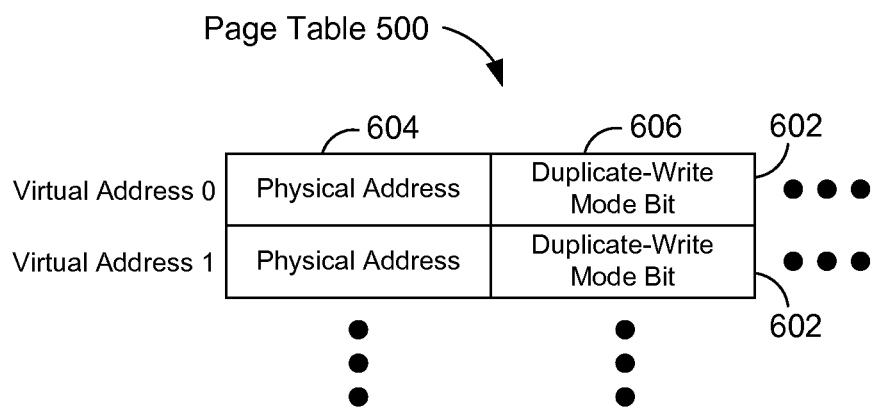
FIG. 6A shows a data structure for the page table of FIG. 5A in accordance with some embodiments.

FIG. 6A shows a data structure for the page table 500 (FIG. 5A) in accordance with some embodiments. The page table 500 includes a plurality of rows 602, each corresponding to a distinct virtual address. The virtual addresses index the rows 602. For example, a first row 602 corresponds to a first virtual address ("virtual address 0") and a second row 602 corresponds to a second virtual address ("virtual address 1"). Each row 602 includes a physical address field 604 to store a physical address that maps to the row's virtual address and a duplicate-write mode bit field 606 to store the duplicate-write mode bit assigned to the row's virtual address, and thus to the physical address in the field 604. Each row 602 may also include additional fields (not shown). While the page table 500 is shown as a single table in FIG. 6A for purposes of illustration, it may be implemented as a plurality of hierarchically arranged tables indexed by respective portions of virtual addresses.

Figure 5B:
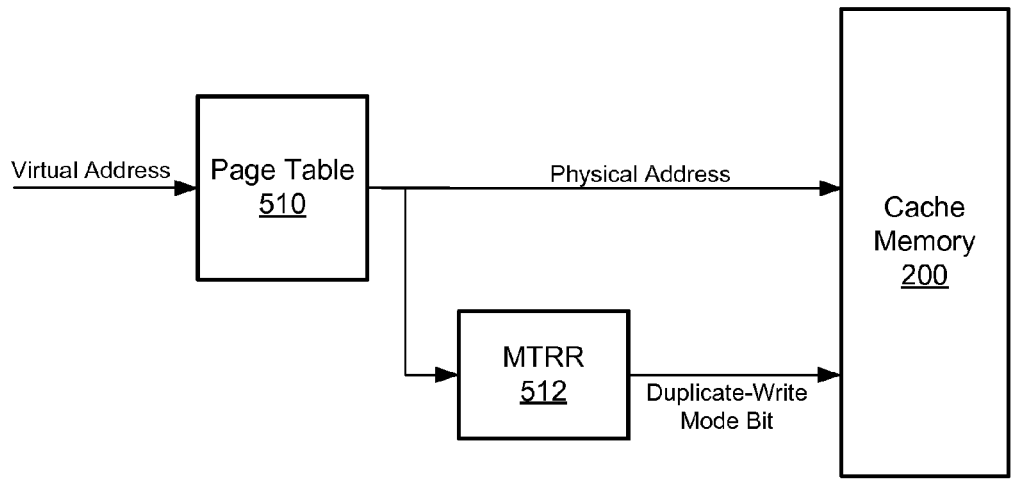
FIG. 5B is a block diagram showing a page table and a memory-type range register (MTRR) coupled to a cache memory, wherein the MTRR is configured to assign duplicate-write mode bits to ranges of addresses in accordance with some embodiments.

FIG. 5B is a block diagram showing a page table 510 and an MTRR 512 coupled to a cache memory 200 (FIG. 2) in accordance with some embodiments. The page table 510 and MTRR 512 are both implemented, for example, in a processor core 104-0 or 104-1 (FIG. 1). A virtual address (or portion thereof) specified in a memory access request (e.g., a read request or write request) is provided to the page table 510. The page table 510 maps the virtual address to a physical address and provides the physical address to the cache memory 200 and to the MTRR 512. The MTRR 512 identifies a range of physical addresses that includes the physical address received from the page table 510 and determines a corresponding duplicate-write mode bit, which is provided to the cache memory 200.

Figure 6B:
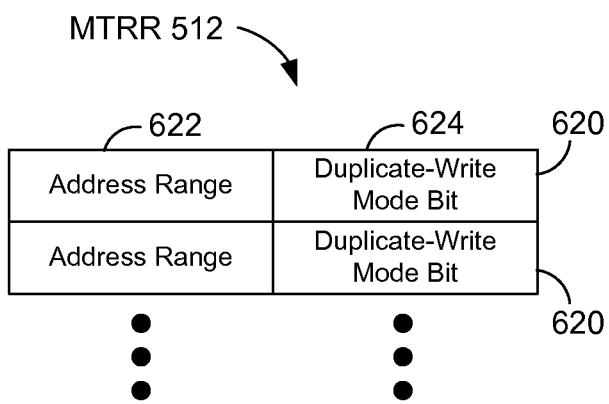
FIG. 6B shows a data structure for the MTRR of FIG. 5B in accordance with some embodiments.

FIG. 6B shows a data structure for the MTRR 512 (FIG. 5B) in accordance with some embodiments. The MTRR 512 includes a plurality of entries 620, each of which includes a field 622 specifying a range of addresses and a field 624 specifying a duplicate-write mode bit for the range of addresses. Every address in the range specified in a field 622 for an entry 620 thus is assigned the duplicate-write mode bit specified in the corresponding field 624.

In some embodiments, the duplicate-write mode bits in the page table 500 (FIGS. 5A and 6A) or the MTRR 512 (FIGS. 5B and 6B) are generated in software. For example, the HDD/SSD 126 (FIG. 1) includes a non-transitory computer-readable storage medium storing instructions that, when executed by one or more of the processor cores 104-0 and 104-1 (FIG. 1), result in the assignment of duplicate-write mode bits to respective addresses in the page table 500 (FIGS. 5A and 6A) or the MTRR 512 (FIGS. 5B and 6B). The instructions may include instructions to generate the page table 500 (FIGS. 5A and 6A) or the MTRR 512 (FIGS. 5B and 6B).

In some embodiments, duplication of dirty cachelines and use of the duplicate cachelines are selectively enabled or disabled for respective processor cores 104-0 and 104-1, for respective threads executed by respective processor cores 104-0 and 104-1, and/or for respective processes.

Furthermore, in some embodiments the type of error detection and/or correction performed by the error detection and/or correction module 216 (FIG. 2) is selectable. For example, the type of error detection and/or correction may be specified based on particular addresses (e.g., as specified using a page table 500, FIG. 5A), address ranges (e.g., as specified using an MTRR 512, FIG. 5B), processor cores 104-0 or 104-1, threads, processes, and/or operating conditions.

Also, in some embodiments two or more duplicates of a dirty cacheline may be installed in the cache memory array 214 (FIG. 2). For example, a mapping function may map the location of a dirty cacheline to two or more locations, and duplicate cachelines may be installed at each of the two or more locations. In some embodiments, the number of duplicate cachelines is configurable and may vary based on particular addresses (e.g., as specified using a page table 500, FIG. 5A), address ranges (e.g., as specified using an MTRR 512, FIG. 5B), processor cores 104-0 or 104-1, threads, processes, and/or operating conditions, for example. In some embodiments, the number of duplicate cachelines is specified by a value stored in the control register 204 of the cache controller 202 (FIG. 2).

Attention is now directed to methods of managing cache memory.

Figure 7A:
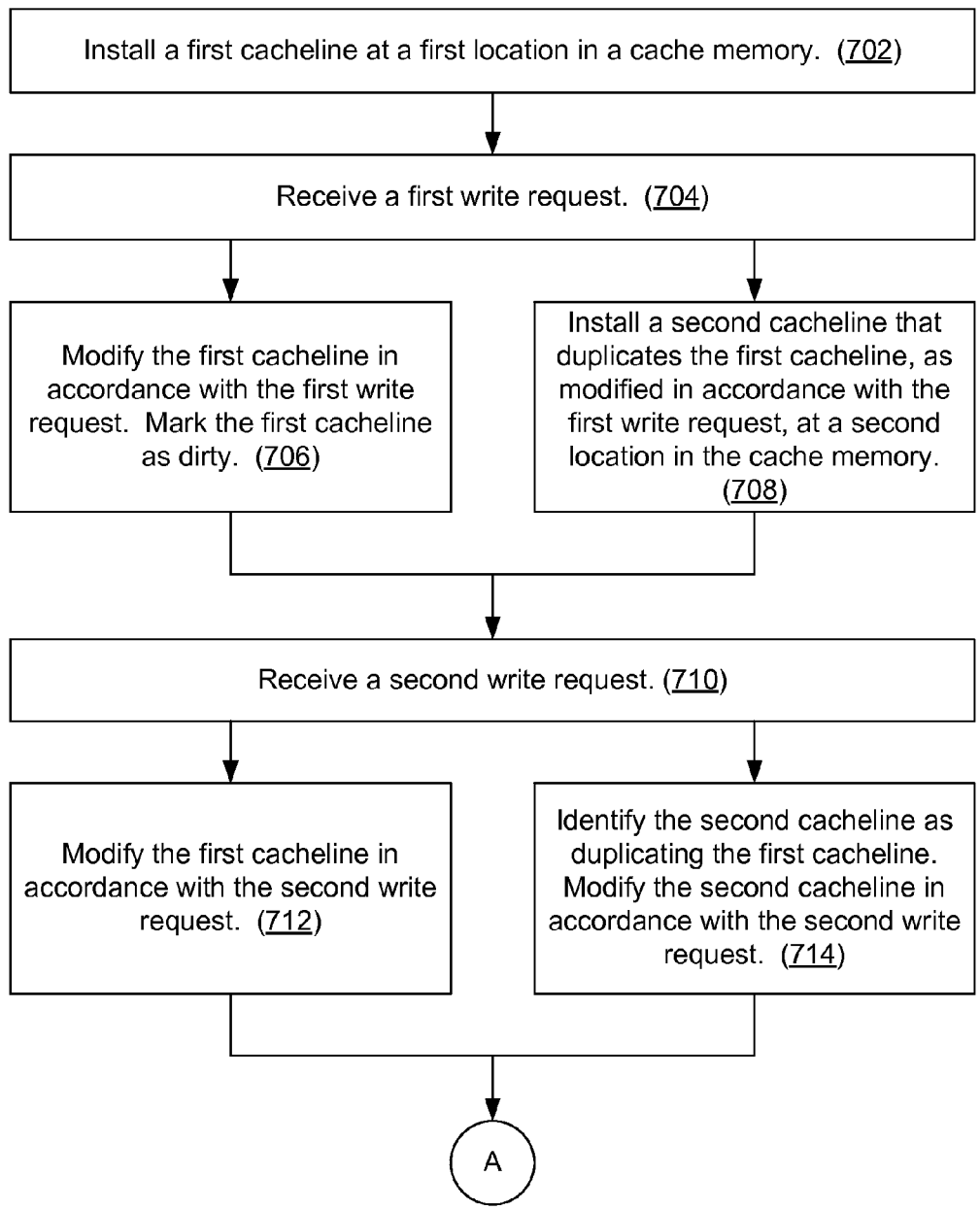
FIGS. 7A-7E are flowcharts showing methods of managing cache memory in accordance with some embodiments.

FIG. 7A is a flowchart showing a method 700 of managing cache memory in accordance with some embodiments. The method 700 may be performed in a cache memory 200 (FIG. 2) that constitutes a level of cache memory in the memory system 100 (FIG. 1).

A first cacheline (e.g., cacheline 306, FIG. 3A, or cacheline 336, FIG. 3B) is installed (702) at a first location in a cache memory (e.g., in the direct-mapped cache memory array 300, FIG. 3A, or the set-associative cache memory array 330, FIG. 3B). At this point in the method 700, the first cacheline is clean: it has not been modified yet.

A first write request is received (704). For example, the first write request is provided to the cache memory 200 (FIG. 2). The first write request is directed at the first cacheline (e.g., it specifies an index and a tag corresponding to the first cacheline) and specifies a modification to the content of the first cacheline.

The first cacheline is modified (706) in accordance with the first write request and marked as dirty. For example, the first cacheline is marked as dirty by asserting a dirty bit in a dirty bit field 410 or 440 (FIGS. 4A-4B) that corresponds to the first cacheline.

A second cacheline (e.g., cacheline 308, FIG. 3B, or cacheline 338, FIG. 3B) is installed (708) at a second location in the cache memory. The second cacheline duplicates the first cacheline, as modified in accordance with the first write request. In some embodiments, the second cacheline is installed (708) in parallel with the modification (706) of the first cacheline, such that the corresponding writes are performed in parallel.

In some embodiments, the second location is determined by applying a mapping function to the first location (e.g., in accordance with Equation (1)). If the mapping function identifies a single location, that location is used as the second location. If the mapping function identifies multiple candidate locations, one of the candidate locations is selected as the second location based, for example, on one or more pre-defined criteria (e.g., based on error rates as tracked by the error tracker 208, FIG. 2) (e.g., the LRU candidate location is selected as determined by the access tracker 210, FIG. 2). If a previous cacheline has already been installed at the second location, the previous cacheline is evicted to allow for installation of the second cacheline. In some embodiments, the mapping function guarantees that the previous cacheline is clean if the cacheline in the first location was previously clean. A mapping function has this property if MAP(MAP (addr))=addr, where "addr" is the address of the second location. In such embodiments, the previous cacheline is invalidated.

A second write request is received (710). For example, the second write request is provided to the cache memory 200 (FIG. 2). The second write request is directed at the first cacheline (e.g., it specifies an index and a tag corresponding to the first cacheline) and specifies a modification to the content of the first cacheline.

The first cacheline is modified (712) in accordance with the second write request.

The second cacheline is identified (714) as duplicating the first cacheline. The second cacheline is modified (714) in accordance with the second write request. In some embodiments, the write operation that modifies (712) the first cacheline is performed in parallel with the write operation that modifies (714) the second cacheline.

In some embodiments, identifying the second cacheline as duplicating the first cacheline includes determining that the first cacheline is dirty and applying the mapping function to the first location to determine the second location. Alternatively, the first location is mapped to the second location and the duplicate bit in the duplicate bit field 408 (FIG. 4A) or 438 (FIG. 4B) associated with the tag for the second location is checked. In yet another alternative, the first location is mapped to one or more candidate locations and the tag(s) of the one or more candidate locations are checked to determine whether they match the tag specified in the second write request.

In some embodiments, the writes performed for the operations 706, 708, 712, and/or 714 are scheduled after read operations that are more likely to impact performance. Such scheduling is done, for example, in upper-level caches (e.g., the L2 caches 110 and/or L3 cache 112, FIG. 1).

Figure 7B:
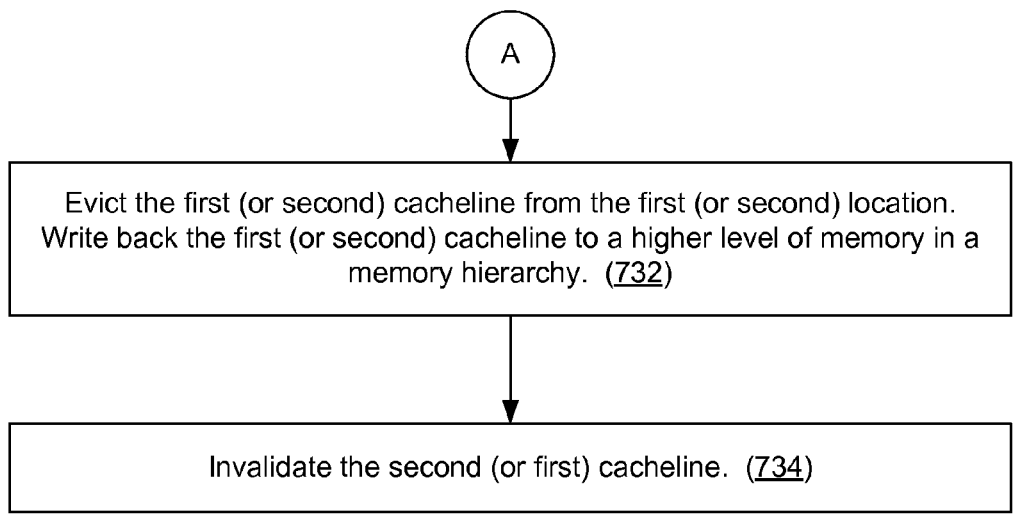
Figure 7C:
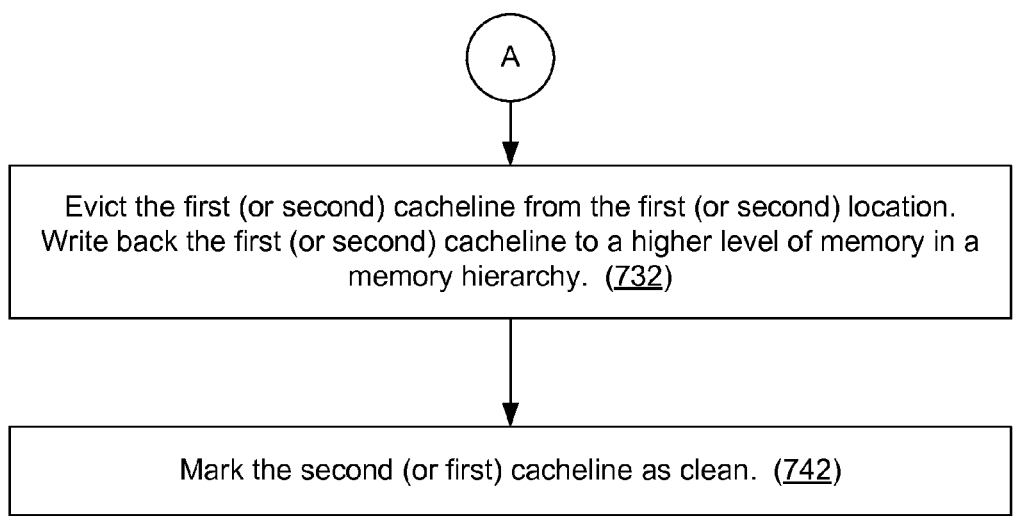

FIGS. 7B and 7C are flowcharts showing respective methods 730 and 740 of managing cache memory in accordance with some embodiments. The methods 730 and 740 are alternate continuations of the method 700 (FIG. 7A) and may be performed in a cache memory 200 (FIG. 2).

In the method 730, the first (or alternately, the second) cacheline of the method 700 is evicted (732) from the first (or second) location and written back (732) to a higher level of memory in a memory hierarchy (e.g., in the hierarchy of the memory system 100, FIG. 1). In response to the eviction of the first (or second) cacheline, the second (or first) cacheline is invalidated (734). For example, the valid bit in the valid bit field 412 (FIG. 4A) or 442 (FIG. 4B) corresponding to the second (or first) cacheline is de-asserted (e.g., set equal to '0').

In the method 740, the first (or alternately, the second) cacheline of the method 700 is evicted (732) from the first (or second) location and written back (732) to a higher level of memory in a memory hierarchy (e.g., in the hierarchy of the memory system 100, FIG. 1). In response to the eviction of the first (or second) cacheline, the second (or first) cacheline is marked as clean (742). The second (or first) cacheline is now considered clean because the information that it stores, which was also stored in the first (or second) cacheline, is now stored in the higher level of memory, as a result of the write-back operation 732.

In some embodiments, when the first (or second) cacheline is evicted, the error detection and/or correction module 216 determines whether the first (or second) cacheline has an error, and whether the error is uncorrectable. If a correctable error is detected, the module 216 corrects the error; the corrected cacheline is then written back to the higher level of memory. If an uncorrectable error is detected, the cache controller 202 reads the second (or first) cacheline (e.g., before invalidating it in the operation 734 of the method 730, FIG. 7B). The module 216 determines whether the second (or first) cacheline has an error and whether the error is correctable. If no error is detected in the second (or first) cacheline, the second (or first) cacheline is written back to the higher level of memory in place of the first (or second) cacheline. If a correctable error is detected, the module 216 corrects the error; the corrected second (or first) cacheline is then written back to the higher level of memory in place of the first (or second) cacheline. If an uncorrectable error is detected, a fault is raised.

Figure 7D:
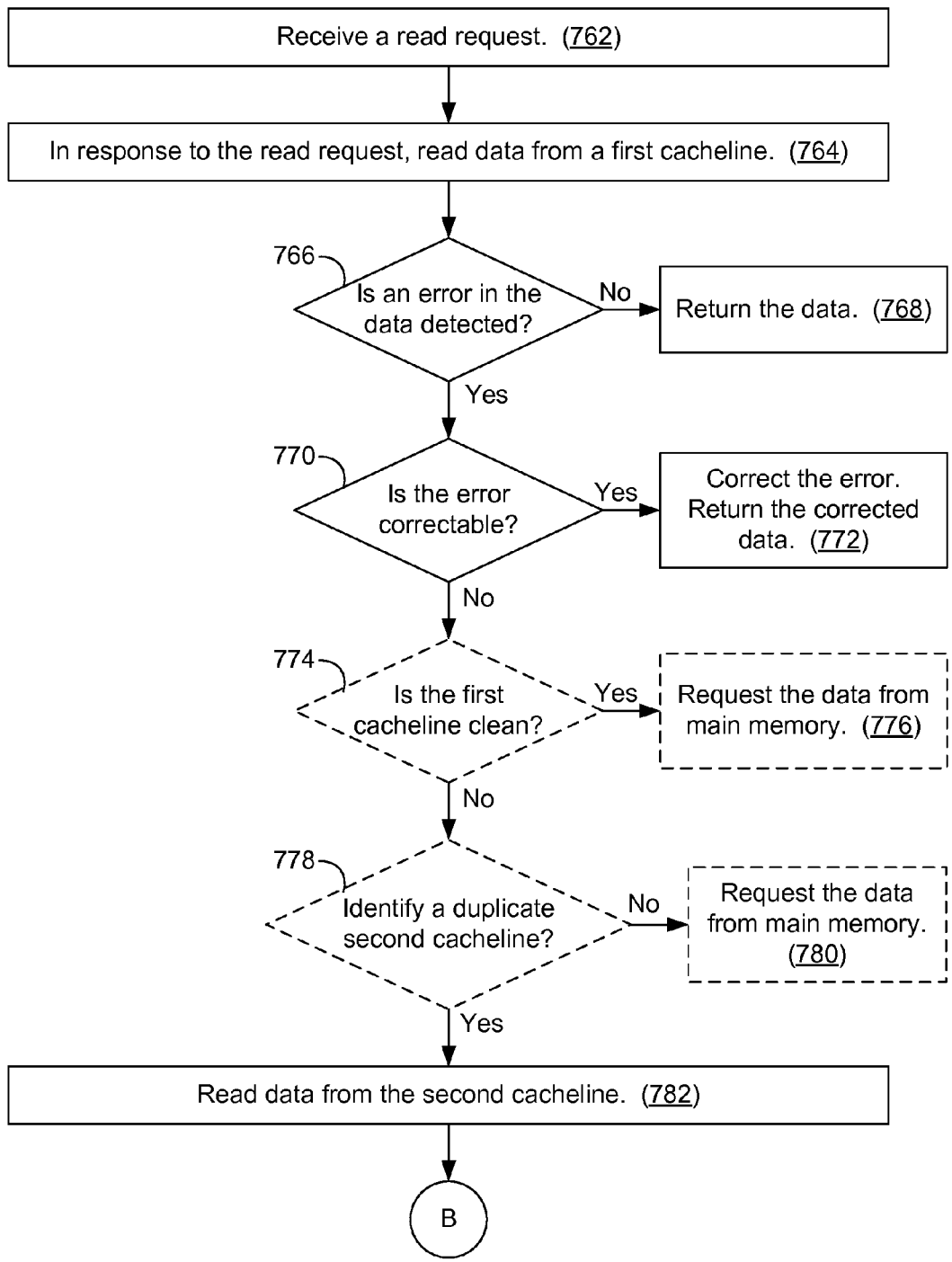
Figure 7E:
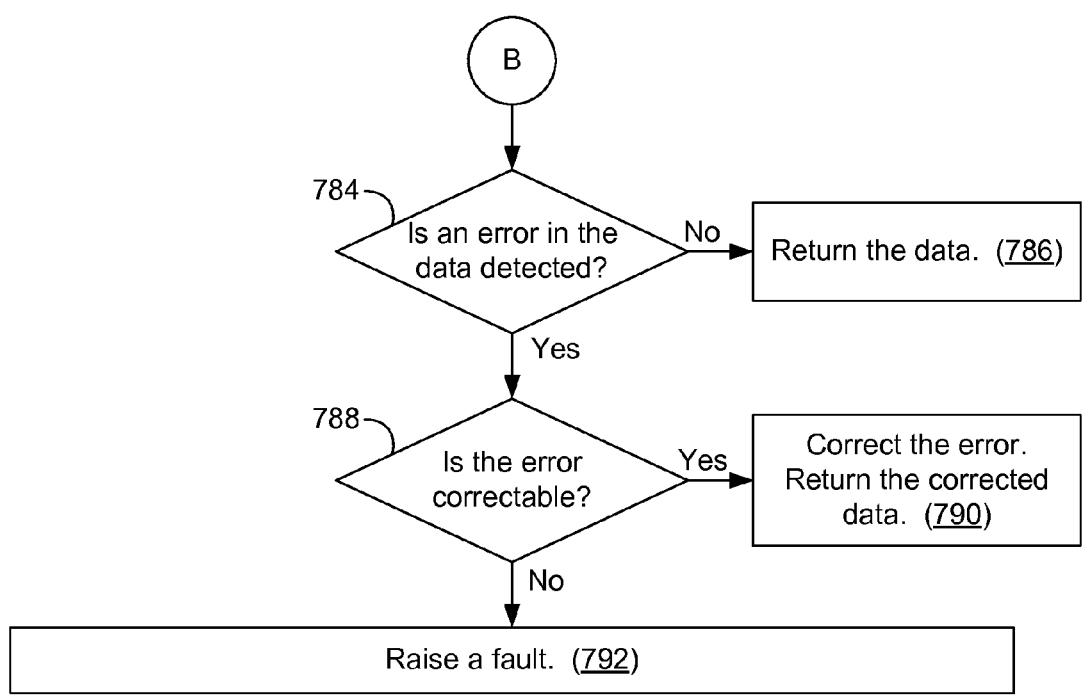

FIGS. 7D and 7E are flowcharts showing a method 760 of managing cache memory in accordance with some embodiments. In some embodiments, the method 760 is a continuation of the method 700 (FIG. 7A) and is performed in a cache memory 200 (FIG. 2).

A read request is received (762, FIG. 7D). For example, the read request is received by the cache controller 202 (FIG. 2).

In response to the read request, data is read (764) from a first cacheline (e.g., the cacheline 306, 310, or 312, FIG. 3A, or the cacheline 336, 340, or 342, FIG. 3B). (In this context, the term data includes any information stored in the first cacheline, and thus may include instructions as well as data to be referenced when executing instructions.)

The error detection and/or correction module 216 (FIG. 2) determines (766) whether an error is detected in the data from the first cacheline. If no error is detected (766—No), the data is returned (768) in response to the read request. If an error is detected (766—Yes), the module 216 determines (770) whether the error is correctable. (If the module 216 only performs error detection and not error correction, all detected errors are uncorrectable.) If the error is correctable (770—Yes), the module 216 corrects the error and returns (772) the corrected data in response to the read request. The corrected data may also be rewritten to the first cacheline to repair the first cacheline.

In some embodiments, if the error is not correctable (770—No), the cache controller 202 determines (774) whether the first cacheline is clean (e.g., based on the dirty bit in the dirty bit field 410, FIG. 4A, or 440, FIG. 4B, associated with the first cacheline). If the first cacheline is clean (774—Yes), the data originally stored in the first cacheline is requested (776) from main memory, or from a higher level of cache memory. If the first cacheline is dirty (774—No), data is read (782) from a second cacheline (e.g., the second cacheline that was installed in the operation 708 of the method 700, FIG. 7A) that duplicates the first cacheline. For example, if the first cacheline is the cacheline 306 (FIG. 3A), data is read from the duplicate cacheline 308. If the first cacheline is the cacheline 336 (FIG. 3B), data is read from the duplicate cacheline 338.

In some embodiments, the determination 774 as to whether the first cacheline is clean is omitted. Instead, the cache controller 202 attempts to identify (778) a second cacheline that duplicates the first cacheline. For example, the first location is mapped to the second location and the duplicate bit in the duplicate bit field 408 (FIG. 4A) or 438 (FIG. 4B) associated with the tag for the second location is checked. In another example, the first location is mapped to one or more candidate locations and the tag(s) of the one or more candidate locations are checked to determine whether they match the tag specified in the read request. The operation 778 thus verifies whether the second cacheline is installed at the second location as a duplicate of the first cacheline, in response to detecting (770—No) the uncorrectable error in the data from the first cacheline. The operation 778 also allows a duplicate cacheline to be identified if the dirty bit for the first cacheline is corrupted.

If the cache controller 202 does not identify a duplicate second cacheline (778—No), the data originally stored in the first cacheline is requested (780) from main memory, or from a higher level of cache memory. The request 780 is based on the assumption that the failure to identify a duplicate second cacheline (778—No) indicates that the first cacheline is clean. Alternatively, the first cacheline is conservatively assumed to be dirty and a fault is raised.

If the cache controller 202 identifies a duplicate second cacheline (778—Yes) (e.g., the second cacheline that was installed in the operation 708 of the method 700, FIG. 7A), data is read (782) from the second cacheline. (Again, the term data as used in this context includes any information stored in the first cacheline, and thus may include instructions as well as data to be referenced when executing instructions). In some embodiments (e.g., if the operation 778 is omitted), the operation 782 includes identifying the second location based at least in part on the first location.

The error detection and/or correction module 216 (FIG. 2) determines (784, FIG. 7E) whether an error is detected in the data read from the second cacheline in the operation 782 (FIG. 7D). If no error is detected (784—No), the data from the second cacheline is returned (786) in response to the read request. The data may also be written to the first cacheline to repair the first cacheline.

If an error is detected (784—Yes), the module 216 determines (788) whether the error is correctable. (If the module 216 only performs error detection and not error correction, all detected errors are uncorrectable.) If the error is correctable (788—Yes), the module 216 corrects the error and returns (790) the corrected data in response to the read request. The corrected data may also be rewritten to the first and second cachelines to repair them.

The operations 786 and 790 thus both respond to the read request based on data from the second cacheline.

If the error in the data from the second cacheline is not correctable (788—No), a fault is raised (792), because a correct (or correctable) copy of the requested data is not available in any level of the memory hierarchy (e.g., in the memory system 100, FIG. 1).

The methods 700, 730, 740, and 760 (FIGS. 7A-7E) improve the level of reliability, availability, and serviceability (RAS) provided by a memory system such as the system 100 (FIG. 1), by providing a duplicate copy of dirty cachelines. This improvement in RAS is provided in an efficient manner: clean cachelines are not duplicated, thus reducing the overhead resulting from the cacheline duplication. This improvement in RAS may be achieved without increasing the complexity of the ECC used by the error detection and/or correction module 216.

While the methods 700, 730, 740, and 760 (FIGS. 7A-7E) include a number of operations that appear to occur in a specific order, it should be apparent that the methods 700, 730, 740, and/or 760 can include more or fewer operations, which can be executed serially or in parallel. An order of two or more operations may be changed, performance of two or more operations may overlap, and two or more operations may be combined into a single operation. For example, the operations 710, 712, and 714 may be omitted from the method 700 (FIG. 7A). In another example, the operation 774, or alternately 778, may be omitted from the method 760 (FIGS. 7D-7E). Furthermore, the methods 700, 730, and/or 760 may be combined into a single method, as may the methods 700, 740, and/or 760.

In some embodiments, operations corresponding to portions of the methods 700, 730, 740, and/or 760 may be implemented in software. This software corresponds to instructions stored in a non-transitory computer-readable medium (e.g., in the HDD/SDD 126, FIG. 1) and configured for execution by the processor cores 104-0 and 104-1 (FIG. 1). For example, these instructions include instructions to issue the first and second write requests of the operations 702 and 710 in the method 700 (FIG. 7A) and the read request of the operation 762 in the method 760 (FIG. 7D). These instructions may also include instructions to map the first location of the first cacheline to the second location of the second cacheline (e.g., in accordance with equation (1)). In some embodiments, these instructions include instructions to identify a second cacheline as a duplicate of the first cacheline (e.g., by performing mapping), in response to detection of an uncorrectable error in data read from the first cacheline, and to request data to be read from the second cacheline in response. The read operation 782 in the method 760 may be performed in response to this request, in accordance with some embodiments.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing memory, comprising:
    installing a first cacheline at a first location in a cache memory;
    receiving a first write request; and
    in response to the first write request:
        modifying a content of the first cacheline in accordance with the first write request;
        marking the first cacheline as dirty; and
        installing a second cacheline at a second location in the cache memory so that the first cacheline and the second cacheline are concurrently stored in the same cache memory, wherein a content of the second cacheline is a duplicate of the content of the first cacheline after the content of the first cacheline has been modified in accordance with the first write request.

2. The method of claim 1, wherein installing the second cacheline comprises determining the second location, the determining comprising applying a mapping function to the first location.

3. The method of claim 2, wherein:
    applying the mapping function to the first location generates a plurality of candidate locations; and
    determining the second location further comprises selecting one of the candidate locations as the second location in accordance with a predefined criterion.

4. The method of claim 1, wherein installing the second cacheline comprises:
    applying a mapping function to the first location to determine the second location, wherein the mapping function indicates that a previous cacheline at the second location is clean when the first cacheline is clean; and
    invalidating the previous cacheline.

5. The method of claim 1, further comprising:
    receiving a second write request after the first write request; and
    in response to the second write request:
        modifying the first cacheline in accordance with the second write request;
        identifying the second cacheline as duplicating the first cacheline; and
        modifying the second cacheline in accordance with the second write request.

6. The method of claim 5, wherein identifying the second cacheline as duplicating the first cacheline comprises:
    determining that the first cacheline is dirty; and
    applying a mapping function to the first location to identify the second location.

7. The method of claim 1, wherein the cache memory is a first level of memory in a memory hierarchy, the method further comprising:
    evicting the first cacheline from the first location, the evicting comprising writing back the first cacheline to a second level of memory above the first level of memory in the memory hierarchy; and
    in response to the evicting, invalidating the second cacheline.

8. The method of claim 1, wherein the cache memory is a first level of memory in a memory hierarchy, the method further comprising:
    evicting the second cacheline from the second location, the evicting comprising writing back the second cacheline to a second level of memory above the first level of memory in the memory hierarchy; and
    in response to the evicting, marking the first cacheline as clean.

9. The method of claim 1, further comprising, after modifying the first cacheline in accordance with the first write request and installing the second cacheline that duplicates the first cacheline:
    receiving a read request; and
    in response to the read request:
        reading data from the first cacheline;
        detecting an uncorrectable error in the data from the first cacheline;
        reading data from the second cacheline; and
        responding to the read request based on the data from the second cacheline.

10. The method of claim 9, further comprising detecting no error in the data read from the second cacheline;
    wherein responding to the read request comprises providing the data from the second cacheline in response to the read request.

11. The method of claim 9, further comprising:
    identifying an error in the data from the second cacheline; and
    correcting the data from the second cacheline to remove the error;
    wherein responding to the read request comprises providing the corrected data from the second cacheline in response to the read request.

12. The method of claim 9, wherein reading data from the second cacheline comprises:
    identifying the second location based at least in part on the first location; and
    reading from the second location.

13. The method of claim 9, further comprising determining that the first cacheline is dirty;
    wherein the data from the second cacheline is read in response to determining that the first cacheline is dirty.

14. The method of claim 9, further comprising verifying that the second cacheline is installed at the second location as a duplicate of the first cacheline, in response to detecting the uncorrectable error in the data from the first cacheline.

15. A memory system, comprising:
    a cache memory to store a plurality of cachelines at respective locations, including a first cacheline at a first location; and
    a cache controller to receive a write request and, in response to the write request, to modify a content of the first cacheline in accordance with the write request, mark the first cacheline as dirty, and install a second cacheline at a second location in the cache memory so that the first cacheline and the second cacheline are concurrently stored in the same cache memory, wherein a content of the second cacheline is a duplicate of the content of the first cacheline after the content of the first cacheline has been modified in accordance with the first write request.

16. The memory system of claim 15, wherein the cache controller comprises mapping logic to determine the second location based at least in part on application of a mapping function to the first location.

17. The memory system of claim 16, wherein:
    the cache memory comprises a plurality of banks;
    the first location is in a first bank of the plurality of banks; and the mapping logic is to map the first bank to a second bank of the plurality of banks, wherein the second location is in the second bank.

18. The memory system of claim 16, wherein:
the cache memory is set-associative and comprises a plurality of ways;
the first location is in a first way of the plurality of ways; and
the mapping logic is to map the first way to a second way of the plurality of ways, wherein the second location is in the second way.

19. The memory system of claim 15, further comprising error detection circuitry, coupled to the cache memory, to detect errors in data accessed from respective cachelines;
wherein the cache controller is to read the second cacheline in response to a determination by the error detection circuitry that data read from the first cacheline includes an uncorrectable error.

20. A non-transitory computer-readable storage medium having stored therein instructions, which when executed by one or more processor cores in a processing system, cause the processing system to:
request data to be read from a first cacheline in a cache memory;
identify a second cacheline concurrently stored in the same cache memory as the first cacheline and having a content that is a duplicate of a content of the first cacheline in the cache memory after the content of the first cacheline has been modified in accordance with a write request, in response to detection of an uncorrectable error in the data from the first cacheline; and
request data to be read from the second cacheline, in response to identifying the second cacheline as a duplicate of the first cacheline.

* * * * *